US012753563B2

(12) United States Patent
Chen et al.

(10) Patent No.: US 12,753,563 B2
(45) Date of Patent: Oct. 6, 2026

(54) PARTITION MONITORING METHOD AND MODEL FOR CONCRETE DAM OPERATION KEY PART

(71) Applicants: HUANENG LANCANG RIVER HYDROPOWER INC., Kunming City (CN); HOHAI UNIVERSITY, Nanjing City (CN); KUNMING UNIVERSITY OF SCIENCE AND TECHNOLOGY, Kunming City (CN)

(72) Inventors: Hao Chen, Kunming City (CN); Haibin Xiao, Kunming City (CN); Tengfei Bao, Kunming City (CN); Daming Zhu, Kunming City (CN); Yingchi Mao, Kunming City (CN); Wei Zeng, Kunming City (CN); Zhiyong Zhao, Kunming City (CN); Minglong Yang, Kunming City (CN); Xu Chen, Kunming City (CN); Zhiting Chen, Kunming City (CN); Hua Liu, Kunming City (CN); Guangyou Shi, Kunming City (CN); Libing Zhang, Kunming City (CN); Haojiang Zhang, Kunming City (CN); Zhen Guan, Kunming City (CN); Fengyu Xie, Kunming City (CN); Shunbo Wang, Kunming City (CN); Xiaokun Xu, Kunming City (CN); Chenglong Xiong, Kunming City (CN); Haifeng Guo, Kunming City (CN)

(73) Assignees: HUANENG LANCANG RIVER HYDROPOWER INC., Kunming City (CN); HOHAI UNIVERSITY, Nanjing City (CN); KUNMING UNIVERSITY OF SCIENCE AND TECHNOLOGY, Kunming City (CN)

( * ) Notice: Subject to any disclaimer, the term of this patent is extended or adjusted under 35 U.S.C. 154(b) by 441 days.

(21) Appl. No.: 18/422,121

(22) Filed: Jan. 25, 2024

(65) Prior Publication Data

US 2025/0012029 A1 Jan. 9, 2025

(30) Foreign Application Priority Data

Jul. 6, 2023 (CN) ......................... 202310826573.9

(51) Int. Cl.

| | |
|---|---|
| ***E02B 7/08*** | (2006.01) |
| ***G01B 5/30*** | (2006.01) |
| ***G06F 17/40*** | (2006.01) |
| ***G06F 18/214*** | (2023.01) |
| ***G06N 3/0442*** | (2023.01) |

(52) U.S. Cl.

CPC .................. *E02B 7/08* (2013.01); *G01B 5/30* (2013.01); *G06F 17/40* (2013.01); *G06F 18/214* (2023.01); *G06N 3/0442* (2023.01); *Y02A 10/40* (2018.01)

(58) Field of Classification Search

CPC ........ E02B 7/08; G06F 17/40; G06F 18/2433; G06F 18/214; Y02A 10/40; G01B 5/30; G06N 3/0442

See application file for complete search history.

(56) References Cited

U.S. PATENT DOCUMENTS

2022/0107251 A1* 4/2022 Ghods ................. B28B 17/0072
2022/0366682 A1* 11/2022 Cha ....................... G06T 7/0002

OTHER PUBLICATIONS

Dashan Yang, Chongshi Gu, Yantao Zhu , Bo Dai, Kang Zhang, Zhiduan Zhang, and Bo Li: (A Concrete Dam Deformation Prediction Method Based on LSTM With Attention Mechanism). Abstract: Dams are the main water retaining structures in the hydraulic engineering field. (Year: 2020).*

(Continued)

*Primary Examiner* — Eman A Alkafawi
*Assistant Examiner* — Joseph O Nyamogo

(57) ABSTRACT

The partition monitoring method for concrete dam operation key parts provided by the disclosure firstly utilizes the (Continued)

extracted monitoring data time-frequency vector to partition the concrete dam key parts, and on this basis, obtains time series measurement data of different types of monitoring instruments with high temporal and spatial correlation, so as to establish a graph structure. Then, the dependence of time dimension and variable dimension of multivariate time series data is captured, and the relationship between further learning and representation of graph attention network is provided. Furthermore, the final feature representation of time series measured data is obtained, and finally the anomaly score is calculated through the final feature representation to detect anomalies. The complementary mutual verification of multiple measuring points of monitoring instruments with various types is realized. The structural integrity and spatial distribution law of concrete dams are fully embodied.

10 Claims, 10 Drawing Sheets

(56) References Cited

OTHER PUBLICATIONS

Hyesook Son, Yun Jang, (Member, IEEE), Seung-Eock Kim, Dongjoo Kim, and Jong-Woong Park (Deep Learning-Based Anomaly Detection to Classify Inaccurate Data and Damaged Condition of a Cable-Stayed Bridge). Abstract Cables of cable-stayed bridges are gradually damaged by weather conditions, vehicle loads (Year: 2021).*

* cited by examiner

PARTITION MONITORING METHOD AND MODEL FOR CONCRETE DAM OPERATION KEY PART

CROSS REFERENCE TO RELATED APPLICATION

This patent application claims the benefit and priority of Chinese Patent Application No. 202310826573.9, filed on Jul. 6, 2023, the disclosure of which is incorporated by reference herein in its entirety as part of the present application.

TECHNICAL FIELD

The disclosure relates to the technical field of safety monitoring of concrete dam structures, in particular to a partition monitoring method and model for concrete dam operation key parts.

BACKGROUND ART

The layout of safety monitoring instruments for concrete dam structure is based on the principle of giving consideration to structural safety and engineering economy, and the calculation results are based on the arch-beam load sharing method. The layout of safety monitoring instruments for concrete dam structure are in accordance with the technical requirements of controlling key parts, paying attention to the relationship between time and space, and the multi-type monitoring instruments of key parts are mutually standby and mutually verified. The layout of safety monitoring instruments for concrete dam structure takes the horizontal arch ring as the arch direction monitoring base surface and the vertical dam section as the beam direction monitoring cross section, and all kinds of monitoring instruments are deployed on the monitoring base surface and monitoring cross section to form the monitoring spatial grid system for concrete dam arch beam.

The monitoring data reflecting the operation state of concrete dams can be collected through the measuring points arranged on the monitoring spatial grid of arch beams. Under the influence of external factors, there is a certain correlation between the same or multiple types of monitoring data in various parts. This correlation is mainly manifested in the similarity of time series trends of monitoring data in the same or similar parts.

Because the influence and even destruction of internal and external loads on the structural parts of concrete dams are random, there is still a lack of means to dynamically determine the key parts by analyzing the monitoring data of the structure. For the monitoring model of specific monitoring parts, at present, the monitoring data of the same type of instruments with high correlation degree are widely used to construct multi-measuring point correlation model to carry out the diagnosis and analysis of structural parts, but there is a lack of relevant research on establishing partition monitoring model using monitoring data of various types of instruments. The technical requirement that the monitoring effect quantity of structure must be mutually verified and comprehensively analyzed by monitoring data of various types of instruments cannot be met.

SUMMARY

Therefore, the technical problem to be solved by the disclosure is to overcome the problems in the prior art that it is difficult to dynamically divide the key parts when the concrete dam is subjected to various loads, and it is impossible to accurately diagnose the operation behavior of the key parts only by measuring data of a single type of monitoring instrument.

In order to solve the above technical problems, the disclosure provides a partition monitoring method for of concrete dam operation key parts, which includes:

- dividing the concrete dam operation key parts into partitions, and obtaining time series measurement data of monitoring instruments with different types in one of the partitions;
- establishing graph structures on the time series measurement data in a time dimension and a variable dimension respectively to obtain a time feature graph and a inputting the time feature graph and the variable feature graph into a time graph attention network and a variable graph attention network respectively to obtain a time attention matrix and a variable attention matrix;
- splicing and inputting the time series measurement data, the time attention matrix and the variable attention matrix into a gated convolution network to obtain a target feature;
- calculating an abnormal score according to the target feature, and judging a concrete dam operation is abnormal if the abnormal score exceeds a preset threshold.

In some embodiments, the dividing the concrete dam operation key parts into partitions includes:

- constructing a measuring point time-frequency vector space-time data matrix according to a measuring point time-frequency vector and a measuring point space vector of the concrete dam operation key parts;
- applying Gaussian mixture clustering to the measuring point time-frequency vector space-time data matrix, and taking spatial information of concrete dam safety measuring points as a prior knowledge of component quantity, and constructing a division model of the concrete dam operation key parts under a spatial constraint;
- iteratively optimizing and solving parameters of the division model of the concrete dam operation key parts by applying an expectation maximization algorithm to obtain an iteratively optimized division model of the concrete dam operation key parts;
- dividing the concrete dam operation key parts by using the iteratively optimized division model of the concrete dam operation key parts.

In some embodiments, obtaining the measuring point time-frequency vector includes:

- decomposing monitoring data of a historical concrete dam structure by a wavelet packet transform, and calculating wavelet packet coefficients of an M layer;
- extracting a time domain vector for each of low-frequency coefficients in the wavelet packet coefficients of the M layer;
- calculating a wavelet energy spectrum of each of the wavelet packet coefficients in the M layer and extracting a frequency domain vector;
- respectively normalizing the time domain vector corresponding to a plurality of the low-frequency coefficients and the frequency domain vector corresponding to a plurality of the wavelet packet coefficients to obtain a normalized time domain vector and a normalized frequency domain vector, and calculating and obtaining the measuring point time-frequency vector according to the normalized time domain vector and the normalized frequency domain vector.

In some embodiments, the establishing graph structures on the time series measurement data in a time dimension and a variable dimension respectively to obtain a time feature graph and a variable feature graph includes:

- setting an embedding vector for each of variables in the time series measurement data;
- calculating correlation of the variables according to embedding vectors corresponding to any two variables;
- connecting any one of the variables with top K neighbor variables with a greatest correlation of the any one of the variables by first edges in a spatial graph to obtain the variable feature graph;
- setting an embedding vector and a position code at each of time points in a sliding time window for the time series measurement data;
- calculating time correlation according to embedding vectors corresponding to any two time points;
- connecting data at any one of the time points with top K neighbor time points with a greatest time correlation of the data at any one of the time points by second edges in the spatial graph to obtain the time feature graph.

In some embodiments, the inputting the time feature graph and the variable feature graph into a time graph attention network and a variable graph attention network respectively to obtain a time attention matrix and a variable attention matrix includes:

- respectively inputting the variable feature graph into a multi-head attention module, an intra-indicator attention module and an inter-indicator attention module in the variable graph attention network, capturing a variable dependence between multivariate time measured data, a correlation of all measuring points under monitoring instruments with same types and a correlation of all measuring points under the monitoring instruments with different types;
- splicing an output of the multi-head attention module, an output of the intra-indicator attention module and an output of the inter-indicator attention module to obtain the variable attention matrix;
- inputting the time feature graph into the time graph attention network, aggregating data of neighbor time points to update a feature representation of each one of the time points by combining the position code and using the multi-head attention module, and obtaining the time attention matrix.

In some embodiments, the calculating an abnormal score according to the target feature includes:

- inputting the target feature into a prediction module and a reconstruction module to obtain a prediction value and a reconstruction probability;
- calculating the abnormal score according to the prediction value and the reconstruction probability.

In some embodiments, the prediction module is a multilayer perceptron.

In some embodiments, the reconstruction module includes a discriminator and an autoencoder.

In some embodiments, a calculation formula for the calculating the abnormal score according to the prediction value and the reconstruction probability is:

$$\text{score} = \sum_{i=1}^{N} \frac{(1-p_i)+\gamma_2(x_i-\hat{x}_i)^2}{1+\gamma_2}$$

where, $\hat{x}_i$ is the prediction value, $X_i$ is a measured value, $\gamma_2$ is a superparameter for balancing the prediction module and the reconstruction module, and $p_i$ is the reconstruction probability.

The disclosure also provides a partition monitoring model for concrete dam operation key parts, which includes:

- a data acquisition module configured for dividing the concrete dam operation key parts into partitions and obtaining time series measurement data of monitoring instruments with different types in one of the partitions;
- a feature graph construction module configured for establishing graph structures on the time series measurement data in a time dimension and a variable dimension respectively to obtain a time feature graph and a variable feature graph;
- an attention mechanism module configured for inputting the time feature graph and the variable feature graph into a time graph attention network and a variable graph attention network respectively to obtain a time attention matrix and a variable attention matrix;
- a target feature acquisition module configured for splicing and inputting the time series measurement data, the time attention matrix and the variable attention matrix into a gated convolution network to obtain a target feature;
- an anomaly detection module configured for calculating an abnormal score according to the target feature, where the anomaly detection module judges a concrete dam operation being abnormal if the abnormal score exceeds a preset threshold.

Compared with the prior art, the technical scheme of this embodiment has the following advantages.

In the disclosure, the partition monitoring method for concrete dam operation key parts obtains time series measurement data of different types of monitoring instruments with high temporal and spatial correlation on basis of partitioning the concrete dam key parts, so as to establish a graph structure. Then, the dependence of time dimension and variable dimension of multivariate time series data is captured, and the relationship between further learning and representation of graph attention network is provided. Furthermore, the final feature representation of time series measured data is obtained, and finally the anomaly score is calculated through the final feature representation to detect anomalies. The complementary mutual verification of multiple measuring points of monitoring instruments with various types is realized. The structural integrity and spatial distribution law of concrete dams are fully embodied.

BRIEF DESCRIPTION OF THE DRAWINGS

In order to make the contents of the disclosure more clearly understood, the disclosure will be further described in detail according to specific embodiments of the disclosure and with the accompanying drawings, in which.

DETAILED DESCRIPTION OF THE EMBODIMENTS

The core of the embodiment is to provide a partition monitoring method and model for concrete dam operation key parts, the complementary mutual verification of multiple measuring points of monitoring instruments with various types is realized, the structural integrity and spatial distribution law of concrete dams are fully embodied.

In order to make those skilled in the art better understand the scheme of the disclosure, the disclosure will be further described in detail with attached drawings and specific embodiments. Apparently, the described embodiment is only a part of the embodiment of the disclosure, not all of the embodiment. Based on the embodiments in the disclosure, all other embodiments obtained by those skilled in the art without creative efforts belong to the protection scope of the disclosure.

According to the design principles and technical requirements, various types of monitoring instruments are arranged at the key parts of the concrete dam for the same monitoring effect, and the effects of mutual backup and mutual verification are achieved. Based on this, on the basis of dividing the concrete dam operation key parts, this embodiment establishes a partition monitoring method for the key parts with complementary mutual verification of multiple measuring points of multi-type monitoring instruments, so as to online judge of the operational behavior of concrete dams.

Figure 1:
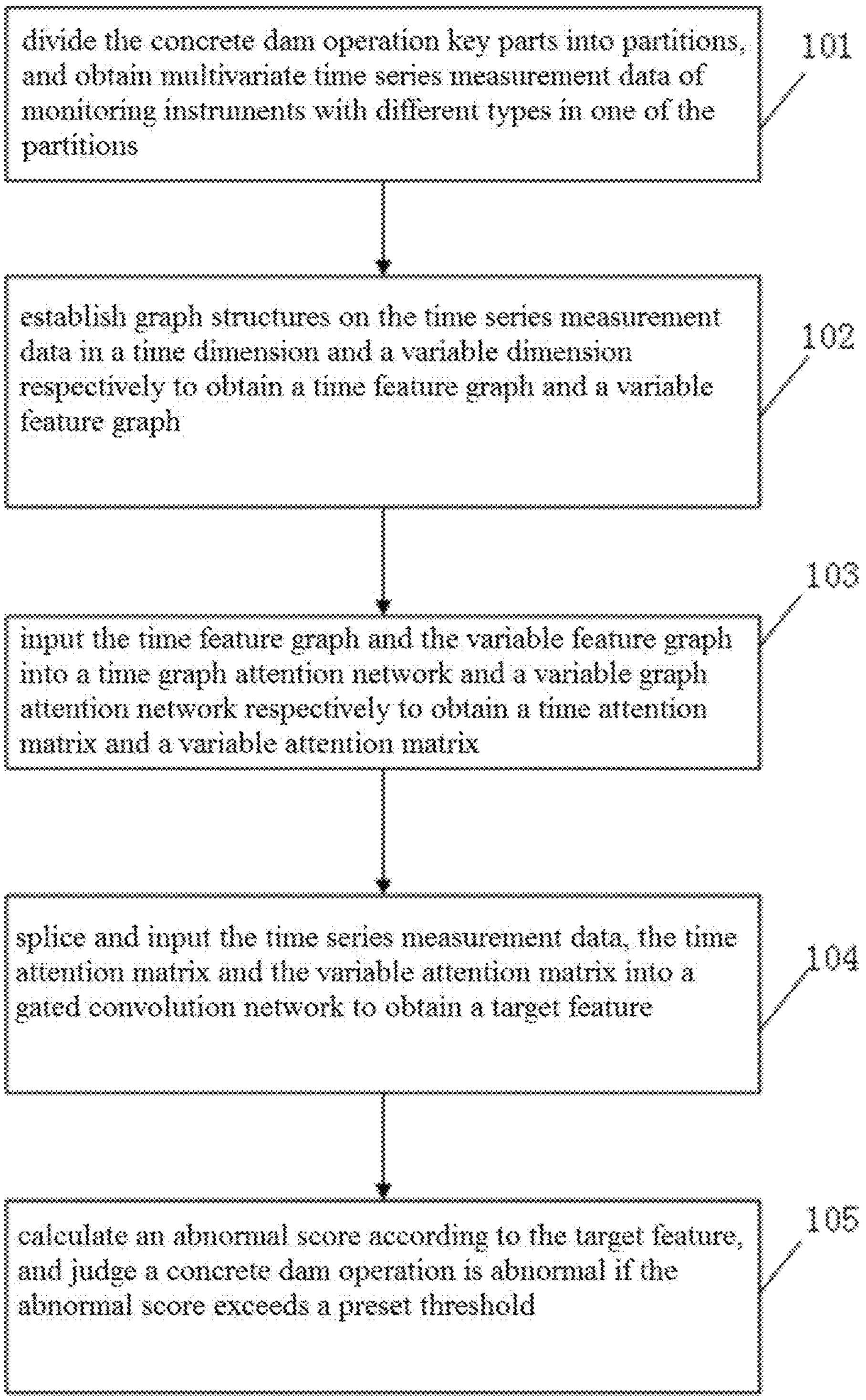
FIG. 1 is a flowchart of a partition monitoring method for concrete dam operation key parts according to embodiments of the disclosure.

Please refer to FIG. 1, which is a flowchart of a partition monitoring method for concrete dam operation key parts according to the disclosure. The specific operation steps are as follows.

S101: the concrete dam operation key parts are divided into partitions, and time series measurement data of monitoring instruments with different types in one of the partitions is obtained.

According to the time-space feature matrix of monitoring data of concrete dam, the monitoring data of various types and multi-measuring points involved in the concrete dam operation key parts are usually multivariate time series data. The multivariate time series data consists of a set of univariate time series data. The indicators represented by each univariate time series data have unique attributes, and these indicators are interrelated through linear and nonlinear relationships.

S102: the time series measurement data is established graph structures in a time dimension and a variable dimension respectively to obtain a time feature graph and a variable feature graph.

S103: the time feature graph and the variable feature graph are inputted into a time graph attention network and a variable graph attention network respectively to obtain a time attention matrix and a variable attention matrix.

S104: the time series measurement data, the time attention matrix and the variable attention matrix are spliced and inputted into a gated convolution network to obtain a target feature.

S105: an abnormal score is calculated according to the target feature, and a concrete dam operation is judged to be abnormal if the abnormal score exceeds a preset threshold.

Based on the above embodiment, step S101 is described in detail in the embodiment.

Wherein, the specific methods for dividing the concrete dam operation key parts into partitions includes the following.

Step a, time-frequency vector space-time data matrix of measuring points is constructed according to the measuring point time-frequency vector and the measuring point space vector of the concrete dam operation key parts; the idea of constructing the spatio-temporal feature matrix of measuring points of the concrete dam is as follows:

(1) Measured values time-frequency vector of the measuring points: the time-frequency vector of monitoring data of a specific measuring point in a certain period of time is extracted and expressed as n-dimensional vector:

$$x_i=(x_{i1},x_{i2}, \ldots ,x_{in})$$

Where, $x_i$ is the time-frequency vector of the measured data of a certain measuring point in a period of time, $x_{in}$ is a time-frequency vector of the measured data of this measuring point, and the time-frequency vector extracted according to Chapter 3, n=24.

The extracting the time-frequency vector includes:

the monitoring data of historical concrete dam structure are decomposed by wavelet packet transform, and the wavelet packet coefficient of the M layer is calculated;

a time domain vector is extracted from each low-frequency coefficient in the M layer wavelet packet coefficient;

the wavelet energy spectrum of each wavelet packet coefficient in the M layer is calculated and the frequency domain vector is extracted;

The time domain vectors corresponding to multiple low-frequency coefficients and frequency domain vectors corresponding to multiple wavelet packet coefficients are normalized respectively, and the time-frequency vectors are calculated according to the normalized time domain vectors and frequency domain vectors.

(2) The measuring point space vector: each of the measuring points has space attribute, and the three-dimensional space vector is represented as $s(i)=(n_i,e_i,h_i,d_i)$.

Where $n_i$ and $e_i$ respectively represent the horizontal coordinates of layout location of the measuring points; $h_i$ represents the vertical coordinate of layout position of the measuring point; $d_i$ represents the type of monitoring instrument to which the measuring point belongs.

(3) Measuring point space-time vector: combining measuring point time-frequency vector and measuring point space vector to form measuring point space-time vector is expressed as:

$$x_i = [x_{i1}, x_{i2}, \ldots, x_{in} \mid s(i)]_{i=1,2,\ldots,n}$$

(4) Time-space matrix of monitoring data: the time-space matrix is used to represent the collection of various types of measuring points for monitoring items such as deformation, stress-strain, seepage, etc. in a certain structural part of the concrete dam:

$$R_n = \begin{bmatrix} x_{11} & x_{12} & L & x_{1n} & s(1) \\ x_{21} & x_{22} & L & x_{2n} & s(2) \\ M & M & & M & M \\ x_{i1} & x_{i2} & L & x_{in} & s(n) \end{bmatrix}$$

Where, Rn represents the time-frequency vector space-time matrix of monitoring data of all measuring points in a certain structural part.

Step b: Gaussian mixed clustering is applied to the time-frequency vector space-time data matrix of the measuring points, and the spatial information of the safety measuring points of the concrete dam is takes as the prior knowledge of the component quantity, and a division model of the concrete dam operation key parts under spatial constraints is constructed; according to the time-space correlation analysis of the measured values of measuring points of concrete dams, the similarity feature of the measured values of measuring points of the same monitoring project or different monitoring projects are also quite different under various conditions such as the same spatial position, symmetrical position and different elevation positions. But generally speaking, combined with the first law of geography, "Everything is related to other things, but similar things are more closely related", and the relevant technical specifications such as the structural parts of concrete dams and the layout of monitoring systems, the feature similarity of the measured values of measuring points at the same or similar parts is higher. For Gaussian mixture model, the closer the spatial positions of the measuring points are, the greater the probability that the measured values belong to the same Gaussian distribution component. Therefore, taking the spatial information of the safety measuring points of the concrete dam as the prior knowledge of the division model of the concrete dam operation key parts is to put the product between the distance feature and the component weight into the hidden feature vector.

The measured data set of the safety measuring points of the concrete dam $X=(x_1, x_2, \ldots x_N)$ and the spatial nearest measuring point data of the measured data set of the safety measuring points $\overline{X}=(\overline{x}_1, \overline{x}_2, \ldots, \overline{x}_N)$ are obtained; the spatial distance of the safety measuring point $q=(q_1, q_2, \ldots, q_N)$ is obtained, where $$q_k = (n_k^2 + e_k^2 + h_k^2)^{\frac{1}{2}},$$

$n_k$, $e_k$, $h_k$ respectively represent the three-dimensional coordinate information of the measuring points, k=1 . . . N; a spatial distance feature $Q=(Q_1, Q_2, \ldots, Q_N)$ is calculated according to the spatial distance of the safety measuring point, where, $$Q_k = \frac{q_{max} - q_k}{q_{max} - q_{min}},$$

$q_{max}$ and $q_{min}$ are the maximum value and the minimum value of q respectively; component weight $\{w_1, w_2, \ldots, w_C\}$ is obtained according to the types of monitoring instruments of safety measuring points, and hidden feature vector $Z=(Z_1, Z_2, \ldots, Z_n)$ is calculated according to the component weights and the spatial distance feature, where, $Z_i=(z_{i1}, z_{i2}, \ldots z_{iC})$, i=1, . . . , N, the value of $z_{ij}$ depends on the spatial distance feature and component weight of the measuring point, in one embodiment, $z_{ij}=w_j*Q_i$, C is the number of components in the division model of concrete dam operation key parts; the joint probability density of $(X,\overline{X},Z)$ is calculated as $$P(X, \overline{X}, Z \mid \Theta) = \prod_{i,j} (w_j f_j(x_i, \theta_j) \square w_j f_j(\overline{x}_i, \theta_j))^{z_{ij}};$$

the log-likelihood function of all data is calculated as:

$$L(\Theta) = \sum_{i=1}^{N} \sum_{j=1}^{C} z_{ij} (\log w_j + \log f_j(x_i, \theta_j) + \log w_j f_j(\overline{x}_i, \theta_j)).$$

Step c: an expectation maximization algorithm is applied to iteratively optimize and solve the parameters of the partition model of the concrete dam operation key parts;

The number C of model components and the mean and covariance matrix of each component are initialized, and make the component weight, $$w_j^{(k)} = \frac{1}{C},$$

k=0; the expectation maximization algorithm is used to calculate the parameters of the division model of concrete dam operation key parts; after removing the k iteration, the division model of the concrete dam operation key parts with components with a component weight of 0, and k=k+1; steps 2-4 are repeated until the model converges, and the model parameters and component numbers of concrete dam operation key parts being iteratively optimized are get.

The applying the expectation maximization algorithm to calculate the parameters of the partition model of the concrete dam operation key parts includes:

according to the current parameters, the posterior distribution $\gamma_{ji}$ of each sample $x_j$ belonging to each Gaussian mixture component is calculated;

the parameters $\{(\alpha_i, \mu_i, \Sigma_i)|1\le i\le k\}$ are updated according to the posterior distribution:

$$\mu_i = \frac{\sum_{j=1}^{m}\gamma_{ji}x_j}{\sum_{j=1}^{m}\gamma_{ji}}$$

$$\Sigma_i = \frac{\sum_{j=1}^{m}\gamma_{ji}(x_j-\mu_i)(x_j-\mu_i)^T}{\sum_{j=1}^{m}\gamma_{ji}}$$

$$\alpha_i = \frac{1}{m}\sum_{j=1}^{m}\gamma_{ji}$$

Step d: the concrete dam operation key parts are divided by using the iteratively optimized the concrete dam operation key parts division model.

Based on the above embodiment, step S102 is described in detail in the embodiment.

The occurrence of abnormal operation of the concrete dam shows that the monitoring data of each indicator changes in time dimension. Therefore, for the monitoring data in the same time window, two graph structures are used to explicitly model the dependence of time and variable dimensions respectively. The details are as follows:

(1) Variable feature graph. Before constructing the variable feature graph, it is necessary to randomly initialize a representation vector for each variable to reduce the decline in the accuracy of the model due to different data types and value ranges. In the hidden representation space composed of embedded vectors, the closer the vectors are, the more similar they are, and the stronger the correlation (that is, the correlation between different types of concrete dam safety monitoring instruments) between their corresponding variables is. Graph attention network needs data with explicit graph structure as input, so the graph structure is constructed by taking N variables in the input time window as N nodes. Firstly, the similarity relationship between nodes is calculated according to the initial representation vectors of nodes, and then the largest node pairs are selected, and the sparse directed graph structure is obtained after edge connection. The specific steps are as follows.

First, an embedding vector $v_i\in\mathbb{R}^d$, $i\in\{1, 2, \ldots, N\}$ is set for each variable, where d represents the dimension of the vector, and different values are set according to the actual situation. The initial value of the vector is given randomly, and the specific value is obtained by continuous adjustment through back propagation in the training process of the model. The correlation of variables can be calculated by embedding vectors, for variable i and variable j, the correlation is calculated by formula (1):

$$e_{ji} = f(v_i, v_j) = \frac{v_j^T v_j}{Pv_iP\cdot Pv_jP} \quad (1)$$

In the formula (1), f $(v_i,v_j)$ is a method to arbitrarily calculating similarity, to construct a directed graph, it is necessary to use asymmetric similarity calculation method and cosine similarity to calculate similarity. After all variables are pairwise combined to calculate similarity, for any variable i, the top k neighbor variables j with the greatest similarity are selected, and i and j are connected by edges in the spatial graph, corresponding to the column where i is located in the spatial adjacency matrix A, which is expressed by formula (2):

$$A_{ji} = \begin{cases} 1 & \text{if } j\in TopK(\{e_{ki}:k\in\{1, 2, \cdots, N\}\}) \\ 0 & \text{else} \end{cases} \quad (2)$$

Where, the value of K can be given by the user according to the specific situation to adjust the sparsity of the graph. The adjacency matrix A can be given directly by the user when there is prior information about the graph structure. In some special scenarios, the adjacency matrix can be set to a matrix with all values of 1, that is, a fully connected graph can be constructed.

(2) Time feature graph. In order to explicitly model the time information between data, the time feature graph in the input time window is constructed by similar steps to the above-mentioned variable feature graph. Time graph is different from variable graph in the setting of embedding vector and composition mode. In variable graph, embedding vectors is to reduce the influence of different variable data types and value ranges on model accuracy. In the time feature graph, besides assuming a corresponding embedding vector for each time point in the sliding window, it is also necessary to introduce Positional Encoding to represent the time and position differences of data. The embedding vector of each node is $u_i\in\mathbb{R}^d$, $i\in\{1, 2, \ldots, \omega\}$, The initial value of $u_i$ is also given randomly, and then the final representation is obtained through training and learning.

For the time series in the input sliding window, a position code $$\vec{pe}_j^{(i)}$$

is given to the vector at any time stamp j, and is calculated by formula (3):

$$\vec{pe}_j^{(i)} = f(j)^i := \begin{cases} \sin(\omega_k\cdot j), & \text{if } i=2k, \\ \cos(\omega_k\cdot j), & \text{if } i=2k+1 \end{cases} \quad (3)$$

$$\omega_k = \frac{1}{1000^{2k/d}}$$

In the formula, d is the dimension of position coding, which needs to be the same as the variable dimension of the current position, that is, d=N, and d needs to be a multiple of 2. Different from taking each variable as a node in the above variable feature graph, in order to construct an explicit time graph structure, it is necessary to take the data at each moment as a node in the graph. The specific form of position coding is calculated by formula (4):

$$\vec{pe}_j = \begin{bmatrix} \sin(\omega_1\cdot t) \\ \cos(\omega_1\cdot t) \\ \sin(\omega_2\cdot t) \\ \cos(\omega_2\cdot t) \\ \vdots \\ \sin(\omega_{N/2}\cdot t) \\ \cos(\omega_{N/2}\cdot t) \end{bmatrix}_{N\times 1} \quad (4)$$

After assigning a position code to each time point, a time graph is constructed by calculating the similarity between embedding vectors at different time points. It it calculated by formula (5):

$$e'_{ji} = f(u_i, u_j) = \frac{u_i^T u_j}{\|u_i\| \cdot \|u_j\|} \tag{5}$$

The pairwise similarity between different time points shows the similarity degree between different timestamps. When constructing a time graph, similar to the above-mentioned variable graph, for data i with any time stamp, K neighbor time points j with the greatest similarity are selected and connected by edges, and the constructed time adjacency matrix is calculated by formula (6):

$$A'_{ji} = \begin{cases} 1 & \text{if } j \in TopK(\{e'_{ki}: k \in \{1, 2, \ldots, \omega\}\}) \\ 0 & \text{else} \end{cases} \tag{6}$$

In the formula, $A' \in \mathbb{R}^{\omega\times\omega}$, the value of K is also specified by the user, which is generally the same as the sparsity of the spatial adjacency matrix.

Based on the above embodiment, step S103 is described in detail in this embodiment:

After the construction of graph structure data, graph attention network is used to learn the information of time dimension and variable dimension. After learning, each node in the graph structure will get a final representation vector, which contains the information of the current node and its adjacent nodes. Graph attention layer includes parallel variable graph attention network and time graph attention network, which is used to capture the dependencies of different dimensions in data at the same time. At the same time, by improving the attention mechanism in the variable graph attention layer, the indicator correlation in the data is explicitly captured. The details are as follows:

(1) Variable Graph Attention Network (F-GAT). The constructed variable feature graph is used as the input of F-GAT, and the information in the graph is further mined through the attention mechanism. First, assume that the feature of F-GAT in the l-layer is expressed as $H^l$, and the initial input formula (7) is:

$$H^0 = (\hat{X} W_{in}) \| V \tag{7}$$

In the formula, $\hat{X}=[x_{t-\omega+1}, x_{t-\omega+2}, \ldots, x_t] \in \mathbb{R}^{N\times\omega}$ is the input series with length ω at the time stamp t, $W_{in} \in \mathbb{R}^{\omega\times d}$ is the learnable transformation matrix of the input data, || is the splicing operation, and V is the matrix formed by the node representation vectors.

Figure 2:
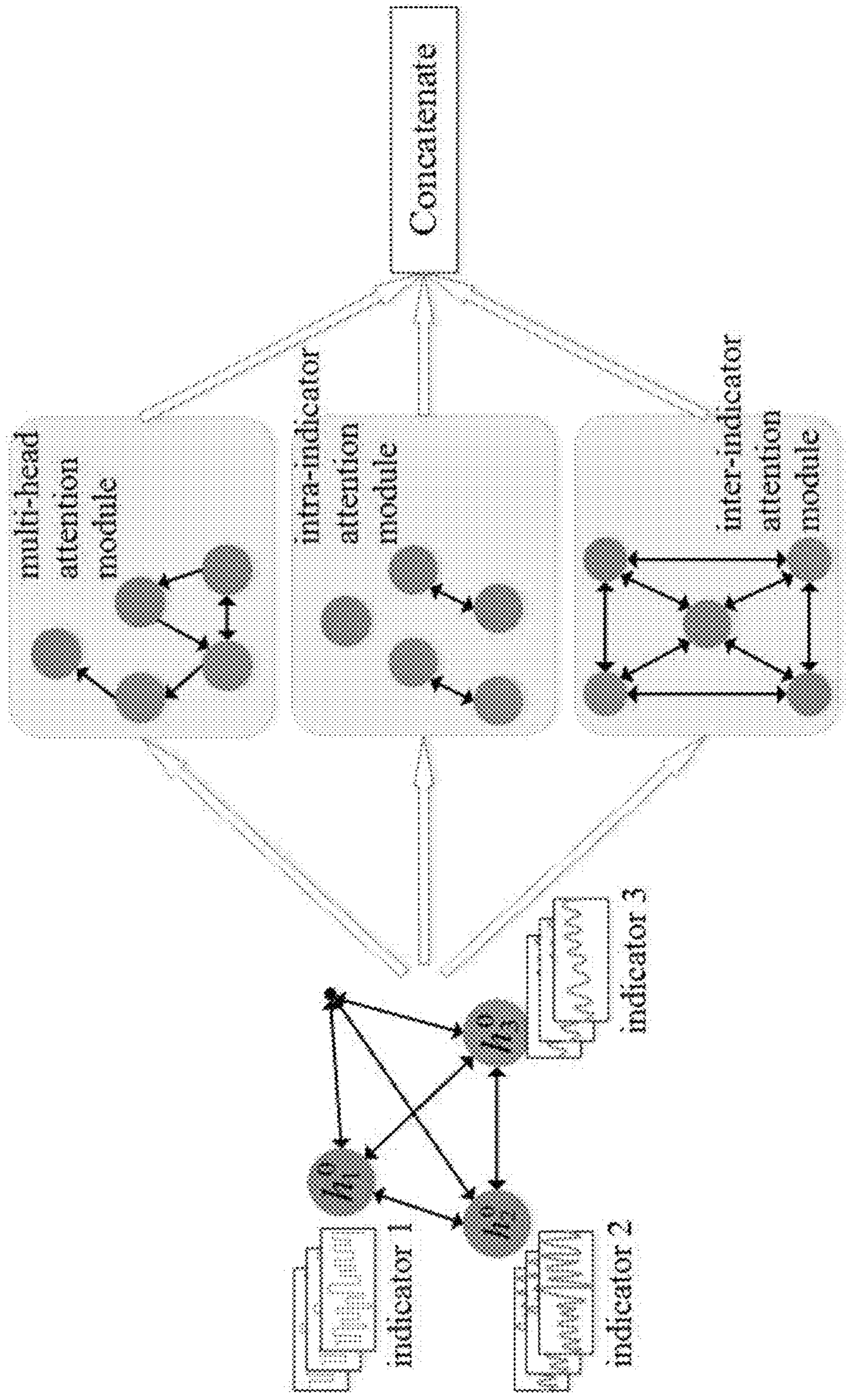
FIG. 2 is an F-GAT network architecture diagram.

The framework of F-GAT is shown in FIG. 2, which includes three modules: multi-head attention, intra-indicator attention and inter-indicator attention. The multi-head attention module mainly models the variable dependence between multivariate time series, and the intra-indicator attention and inter-indicator attention is used to capture the indicator correlation between different time series. Specifically, the intra-indicator attention correlation is the correlation of all measuring points under the same type of monitoring instrument. For example, the deformation monitoring project of concrete dam includes many types of monitoring instruments, such as normal vertical line, surface deformation observation, static leveling, seam gauge, etc., the range of intra-indicator attention refers to all the measuring points included in the monitoring instruments such as normal vertical line. The correlation of inter-indicator attention is the correlation of different types of monitoring instruments, for example, the deformation monitoring project of concrete dam includes many types of monitoring instruments such as normal vertical line, surface deformation observation, static leveling, seam gauge, etc. The range of inter-indicator attention is normal vertical line measuring point, surface deformation observation point, static leveling point, seam gauge and other types of monitoring instruments.

The multi-head attention module updates the feature representation of each node by aggregating the neighbor node information of the target node, and is calculated by formula (8):

$$h^{l+1}_{att_i} = \|_{s=1}^{S} \sum_{j\in N_i} \alpha^{ls}_{ij} W^{ls}_{att} h^l_j \tag{8}$$

Where, $$h^{l+1}_{att_i}$$

is the feature representation of the node i in the l+1 layer, || is the splicing operation, S represents the number of attention heads, $$\alpha^{ls}_{ij}$$

represents the attention score of node i and node j in the s attention head in the l layer, $$W^{ls}_{att}$$

is the learnable weight matrix of the s attention head in the l layer, $$h^l_j \in H^l$$

is the feature representation of the node j in the l layer, and $\mathcal{N}_i=\{j|A_{ij}>0\}$ B is the set of neighbor nodes of node i in the adjacency matrix A representing the variable feature graph above. The attention score is calculated by formulas (8), (9) and (10):

$$\alpha^{ls}_{ij} = \text{attention}(i, j) = \frac{\exp(\pi(i, j))}{\sum_{k\in N(i)\cup\{i\}} \exp(\pi(i, k))} \tag{9}$$

$$\pi(i, j) = LeakyReLU\left(a^T\left(g^{ls}_i \| g^{ls}_j\right)\right) \tag{10}$$

$$g^{ls}_i = v_i \| W^{ls}_{att} h^l \tag{11}$$

Where, $a^T$ is a learnable bias vector, || is a concatenation operation, and LeakyReLU is a nonlinear activation function.

The traditional graph attention network fails to consider the indicator correlation of multivariate time series, so it loses some important information of variable dimension. Neighboring nodes with different dependencies have different influences on the central node. In this section, by adding two relational attention modules, namely, intra-indicator attention and inter-indicator attention, the effectiveness of the model in modeling the dependence of variables between series is improved. The adjacency matrix of intra-indicator attention diagram and inter-indicator attention diagram is defined by formulas (12) and (13):

$$A_{intra}^{ij} = \begin{cases} 1, & j \in C_{intra}^{i} \\ 0, & \text{else} \end{cases} \tag{12}$$

$$A_{inter}^{ij} = \begin{cases} 1, & j \in C_{inter}^{i} \\ 0, & \text{else} \end{cases} \tag{13}$$

Where, $$C_{intra}^{i} = \{j \mid m_i = m_j\} \text{ and } C_i^{inter} = \{j \mid m_i \neq m_j\}$$

are the candidate sets, that is, $$C_{intra}^{i}$$

represents node that belong to the same indicator as node i, and $$C_i^{inter}$$

represents node that have different monitoring indicators from node i. It should be noted that when $$|C_{intra}^{i}| > K \text{ or } |C_i^{inter}| > K,$$

the adjacency matrix needs to be constructed using the TopK operation to select the indicator of the top K maximum cosine similarity.

Then, the multi-indicator correlations between different time series are clearly captured by two relational attention modules. The feature of the intra-indicator attention module is calculated by formula (14), formula (15) and formula (16):

$$h_{intra_i}^{l+1} = \sum_{j \in N_{intra_i}} \beta_{intra_i}^{lj} W_{intra}^{l} h_j^{l} \tag{14}$$

$$\beta_{intra_i}^{lj} = \frac{\exp(g_{intra_i}^{lj})}{\sum_{j \in N_{intra_i}} \exp(g_{intra_i}^{lk})} \tag{15}$$

$$g_{intra_i}^{lj} = \sigma\left(ReLU\left((v_i \| v_j) W_{intra1}^{l} + b_{intra1}^{l}\right) W_{intra2}^{l}\right) \tag{16}$$

In the formula, $$h_{intra_i}^{l+1}$$

is the feature representation of node i at the l+1-layer, $$N_{intra_i} = \{j \mid A_{intra}^{ij} > 0\}$$

is the set of intra-indicator neighbor nodes of node i, $$\beta_{intra_i}^{lj}$$

is the attention scores of node i and node j at the l-layer, $$W_{intra}^{l}, W_{intra1}^{l} \text{ and } W_{intra2}^{l}$$

are the weight matrices of the l-layer, and $$b_{intra1}^{l}$$

is the bias vector of the l-layer. Similarly, the feature representation $$h_{inter_i}^{l+1}$$

of the inter-indicator attention module can be calculated, and $$N_{intra_1} = \{j \mid A_{intra}^{ij} > 0\}$$

is the inter-indicator neighbor node set of node i. The final output $$h_i^{l+1}$$

of the variable graph attention layer is obtained by splicing the inputs of three attention modules, and is calculated by formulas (17) and (18):

$$h_i^{l+1} = ReLU\left(W_{out}^{l+1} o_i^{l+1} + b_{out}^{l+1}\right) \tag{17}$$

$$o_i^{l+1} = h_{att_i}^{l+1} \| h_{intra_i}^{l+1} \| h_{inter_i}^{l+1} \tag{18}$$

In the formula, $$h_i^{l+1}$$

is the final representation of node i at the l+1 layer, $$W_{out}^{l+1}$$

is the weight matrix of the l+1 layer, $$b_{out}^{l+1}$$

is the offset vector of the l+1 layer, || is the splicing operation, and $$o_i^{l+1}$$

is obtained by splicing the intermediate feature $$h_{att_i}^{l+1} h_{intra_i}^{l+1}, \text{ and } h_{inter_i}^{l+1}$$

at the l+1 layer.

(2) Time graph attention network (T-GAT). Assume that Z' is the feature representation of T-GAT in l layer, and the initial input of T-GAT is $$Z^0 = (\hat{X} W'_{in}) || U,$$

where $$W'_{in} \in \mathbb{R}^{d \times \omega}$$

is the learnable transformation matrix of input data and U is the matrix composed of node feature vectors. The time graph attention layer takes the above-mentioned time graph structure as input, combines the position coding, and uses the multi-head attention module to aggregate the information of neighboring nodes to update the feature representation of each time point, and calculates by formula (19):

$$z_i^{l+1} = \|_{s=1}^{S} \sum_{j \in N(i) \cup \{i\}} \alpha_{ij}^{ls'} W_{att}^{ls'} p\overrightarrow{e}_j z_j^l \tag{19}$$

In the formula, $$z_i^{l+1}$$

is the feature representation of node i in the l+1 layer, || is the splicing operation, S represents the number of attention heads, $$N_i = \{j | A'_{ij} > 0\}$$

is the set of neighbor nodes of node i in the adjacency matrix A' of the time graph above, $$\alpha_{ij}^{ls'}$$

is the attention fraction of node i and node j at the s attention head in the l layer, and $$W_{att}^{ls'}$$

is the weight matrix of the s attention head in the l layer, $$z_j^l \in Z^l$$

is the feature representation of node j at the l layer, and the calculation steps of $$\alpha_{ij}^{ls'}$$

are similar to the above steps of $$\alpha_{ij}^{ls'}$$

which can be calculated by formulas (20), (21) and (22):

$$\alpha_{ij}^{ls'} = \frac{\exp(\pi(i, j))}{\sum_{k \in N(g) \cup \{i\}} \exp(\pi(i, k))} \tag{20}$$

$$\pi(i, j) = LeakyReLU\left(a^T\left(c_i^{ls} \| c_j^{ls}\right)\right) \tag{21}$$

$$c_i^{ls} = u_i \| W_{att}^{la'} p\vec{e}_i z^l \tag{22}$$

In the formula, $$\alpha_{ij}^{ls'}$$

represents the attention fraction of node i and node j at the s attention head in the l layer of the time graph, $$W_{att}^{ls'}$$

is the learnable weight matrix of the s attention head in the l layer of the time graph attention module, $a^T$ is the learnable bias vector, || is the splicing operation, and LeakyReLU is the nonlinear activation function.

Based on the above embodiment, step S104 is described in detail in this embodiment:

The output of the variable graph attention network is a N×ω dimensional matrix, and one row of the matrix represents the relationship between a node in the variable feature graph and its neighboring nodes captured by the graph attention network. Similarly, the output of the time graph attention network is a ω×N dimensional matrix. The output of two graph attention layers is spliced with the original time series data to form a ω×3N dimensional matrix, and one row of the matrix represents a 3N dimensional feature vector with a timestamp in the input time window. Finally, the ω×3N dimensional matrix is used as the input of the Gated Convolution Network (GRU), GRU, as a variant of circular convolution network, can capture the series pattern information in the data well and get the target feature.

Based on the above embodiment, step S105 is described in detail in the embodiment:

the target feature is inputted into a prediction module and a reconstruction module to obtain a prediction value and a reconstruction probability, and the anomaly score is calculated according to the prediction value and the reconstruction probability, the details are as follows:

In order to take advantage of both reconstruction-based and prediction-based models, the loss function of MTS-GAT contains two objectives: capturing the distribution of the whole input data in the reconstruction module and accurately predicting the value at the next timestamp in the prediction module. The input $\mathcal{X}_t$ of the reconstruction module and the prediction module at time t is the output of $X_\chi$XGRU. The loss function of joint optimization is defined by formula (23):

$$\mathcal{L} = \gamma_1 \mathcal{L}_{rec} + (1-\gamma_1)\mathcal{L}_{pred} \tag{23}$$

Where, $\mathcal{L}_{rec}$ is the loss function of the reconstruction module, $\mathcal{L}_{pred}$ is the loss function of the prediction module, and $\gamma_1$ is the hyperparameter that balances the weights of the two modules.

The prediction module uses $\mathcal{X}_t$ to predict the observed value at the next time stamp. In this section, Multilayer Perceptron (MLP) is used as the prediction module, and the loss function is defined by formula (24):

$$\mathcal{L}_{pred} = \sqrt{\sum_{i=1}^{N}(x_{i,t+1} - \hat{x}_{i,+1})^2} \tag{24}$$

In the formula, $x_{i,t+1}$ is the measured value at t+1 time of the i time series, and $\hat{x}_{i,t+1}$ is the predicted value at t+1 time of the i series.

Figure 3:
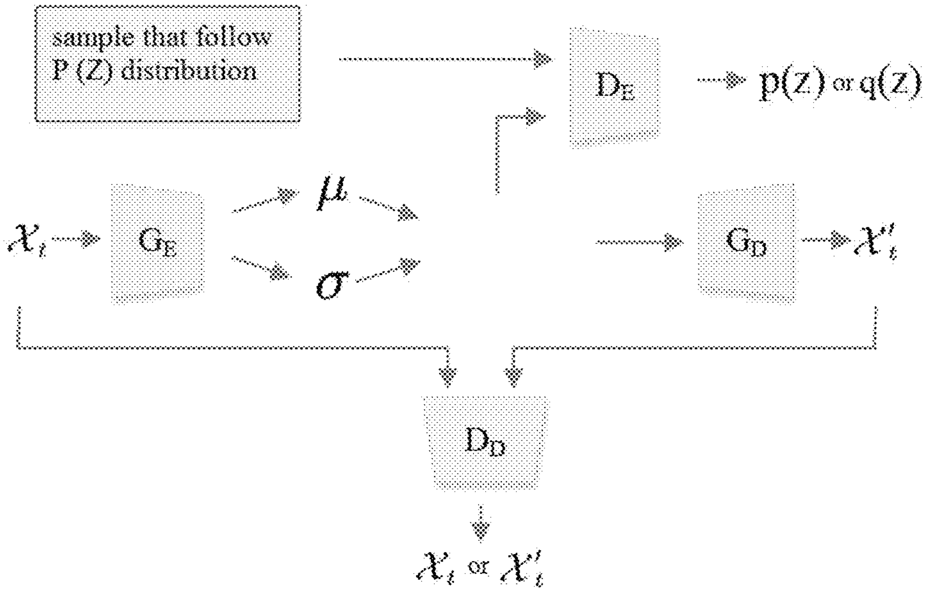
FIG. 3 is a frame diagram of countermeasure generation network.

The reconstruction module is to learn the reconstruction probability of the input data. In order to enhance the robustness of the model, two discriminators $D_E(\bullet)$ and $D_D(\bullet)$ are used for adversarial training of autoencoder $G_A$ as a reconstruction-based model. The encoder $G_E(\bullet)$ and the decoder $G_D(\bullet)$ of $G_A$ can be regarded as two generators. The model is shown in FIG. 3, for a given input $\mathcal{X}_t$, z is the potential representation of the autoencoder, p(z) represents the prior distribution of z, and the posterior distribution q(z) generated by the autoencoder in the potential space is calculated by formula (25):

$$q(z) = \int_{\mathcal{X}_t} q(z \mid \mathcal{X}_t) p_d(\mathcal{X}_t) d\mathcal{X}_t \tag{25}$$

In the formula, $q(z|\mathcal{X}_t)$ represents the code distribution, and $p_d(\mathcal{X}_t)$ represents the input data distribution. The countermeasure network $D_E(\bullet)$ is used to adjust the posterior distribution q(z) to satisfy the prior distribution p(z), that is, the loss function $\mathcal{L}_{D_E}$ is maximized, which is calculated by formula (26):

$$\mathcal{L}_{D_E} = \mathbb{E}_{z\sim p(z)}[\log(D_E(z))] + \mathbb{E}_{\mathcal{X}_t\sim p_d(\mathcal{X}_t)}[\log(1 - D_E(G_E(\mathcal{X}_t)))] \tag{26}$$

The corresponding generator $G_E(\bullet)$ mixes $D_E(\bullet)$, that is, the loss function $\mathcal{L}_{G_E}$ minimized, and is calculated by formula (27):

$$\mathcal{L}_{G_E} = \mathbb{E}_{\mathcal{X}_t\sim p_d(\mathcal{X}_t)}[\log(1 - D_E(G_E(\mathcal{X}_t)))] \tag{27}$$

Similarly, the countermeasure network $D_D(\bullet)$ avoids the over-fitting problem of the model by increasing the difference between the input data and the reconstructed data, that is, the loss function $\mathcal{L}_{D_D}$ is maximized, and is calculated by formula (28):

$$\mathcal{L}_{D_E} = \mathbb{E}_{\mathcal{X}_t\sim p_d(\mathcal{X}_t)}[\log(D_D(\mathcal{X}_t)) + \log(1 - D_D(G_A(\mathcal{X}_t)))] \tag{28}$$

The corresponding generator $G_D(\bullet)$ needs to minimize the loss function $\mathcal{L}_{G_D}$, which is calculated by formula (29):

$$\mathcal{L}_{G_D} = \mathbb{E}_{\mathcal{X}_t\sim p_d(\mathcal{X}_t)}[\log(1 - D_D(G_A(\mathcal{X}_t)))] \tag{29}$$

The reconstruction of the input data is represented as $\mathcal{X}'_t = G_D(G_E(\mathcal{X}_t))$. Finally, $\mathcal{L}_{G_E}$ and $\mathcal{L}_{G_D}$ are used as anti-regularization to ensure the robustness of the reconstructed model, and the loss function of the reconstructed model is defined by formulas (30) and (31):

$$\mathcal{L}_{rec} = \mathcal{L}_r + \mathcal{L}_{G_E} + \mathcal{L}_{G_D} \tag{30}$$

$$\mathcal{L}_r = \mathbb{E}_{\mathcal{X}_t\sim p_d(\mathcal{X}_t)}\|\mathcal{X}_t - G_A(\mathcal{X}_t)\|_1 \tag{31}$$

Where, $\mathcal{L}_r$ represents reconstruction loss.

For the i univariate time series, at any time stamp t, the prediction module generates the prediction value $\hat{x}_i$, and the reconstruction module generates the reconstruction probability $p_i$. The final abnormal score for each timestamp balances the weight of the two modules by formula (32):

$$\text{score} = \sum_{i=1}^{N} \frac{(1-p_i) + \gamma_2(x_i - \hat{x}_i)^2}{1+\gamma_2} \tag{32}$$

In the formula, $x_I$ is the measured value, and $\gamma_2$ is the hyperparameter for balancing the two modules. In the anomaly detection stage, when the anomaly score of a timestamp is greater than the given anomaly threshold, the timestamp is marked as "abnormal timestamp", otherwise it is "normal timestamp". The selection of abnormal threshold is made on the verification set by the peaks-over-threshold (POT) algorithm.

Figure 4:
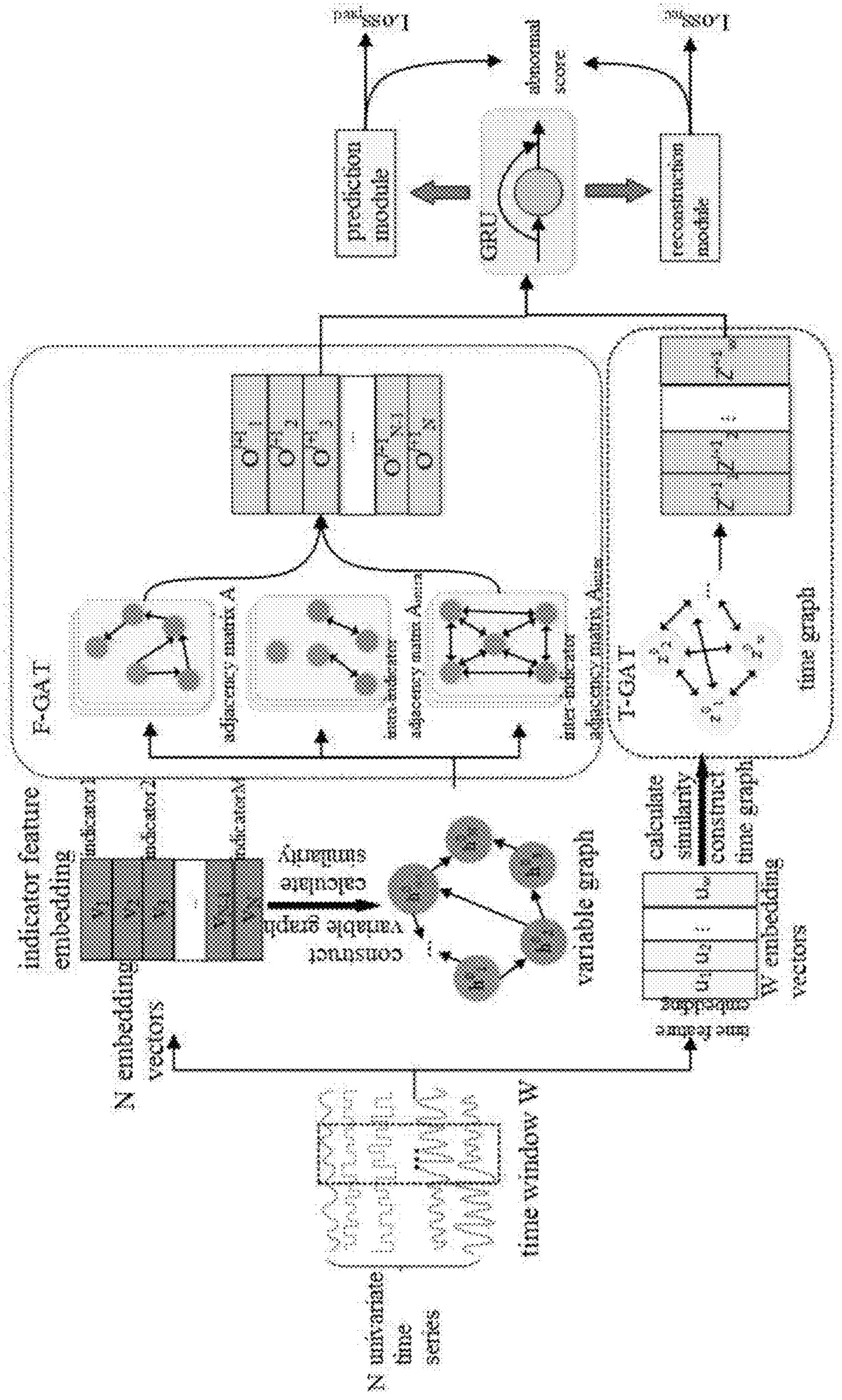
FIG. 4 is a framework of multi-indicator graph attention network model for concrete dam key parts.

Based on the above embodiment, FIG. 4 is the framework of the multi-indicator graph attention network model of the concrete dam key parts provided by an embodiment of the disclosure, and the specific model may include:

a data acquisition module is configured for obtaining the time series measurement data of monitoring instruments with different types in concrete dam structure monitoring;

a feature graph construction module is configured for establishing graph structures on the time series measurement data in a time dimension and a variable dimension respectively to obtain a time feature graph and a variable feature graph;

an attention mechanism module is configured for inputting the time feature graph and the variable feature graph into a time graph attention network and a variable graph attention network respectively to obtain a time attention matrix and a variable attention matrix;

a target feature acquisition module is configured for splicing and inputting the time series measurement data, the time attention matrix and the variable attention matrix into a gated convolution network to obtain a target feature;

an anomaly detection module configured for calculating an abnormal score according to the target feature, where the anomaly detection module judges a concrete dam operation being abnormal if the abnormal score exceeds a preset threshold.

The partition monitoring model for the concrete dam operation key parts in the embodiment is used to realize the above-mentioned partition monitoring method for concrete dam operation key parts. Therefore, the specific implementation of the partition monitoring model for concrete dam operation key parts can be seen in the embodiment of the partition monitoring method for concrete dam operation key parts mentioned above. For example, data acquisition module, feature graph construction module, attention mechanism module, target feature acquisition module, and anomaly detection module are respectively used to realize steps S101, S102, S103, S104 and S105 in the above-mentioned partition monitoring method for the concrete dam operation key parts. Therefore, the specific implementation can refer to the corresponding descriptions of each part of the embodiments, and will not be repeated here.

The embodiment firstly extracts the structure monitoring data time-frequency vector of concrete dam and establishes the monitoring data time-frequency vector space-time matrix of concrete dam. Then, combined with the typical time-frequency vectors of structural monitoring data identified in real time, a key part partition method based on data time-frequency vectors is proposed to dynamically divide the concrete dams key parts. On this basis, the arch crown beam area on the upper part of the dam body is selected, including the dam body with the elevation from 1190 m to 1245 m from the 19 #dam section to the 25 #dam section. Four types of monitoring instruments, such as normal vertical line, surface deformation observation point, static level and seam gauge, are arranged in this key part to monitor the deformation effect. The normal vertical line and surface deformation observation points include C4-A19-PL-01~02, C4-A22-PL-01~02, C4-A25-PL-01~02, C4-A19~A25-TP-01 and C4-A19~A25-TP-02, totally 20 measuring points, which are use for monitoring that horizontal radial and tangential displacements of the part. Static level includes 7 measuring points, that is, 1245-SL4-03~09, which are used to monitor the vertical displacement of the part. The seam gauge includes 10 measuring points, that is, C4-A19-J-33, C4-A25-J-31, C4-A22-KZ-J-04~09, which are used to monitor the opening and closing degree of the transverse seam in this part and the opening and closing degree of the seam-crossing area where the seismic reinforcement is laid on the upstream and downstream surfaces.

Figure 5:
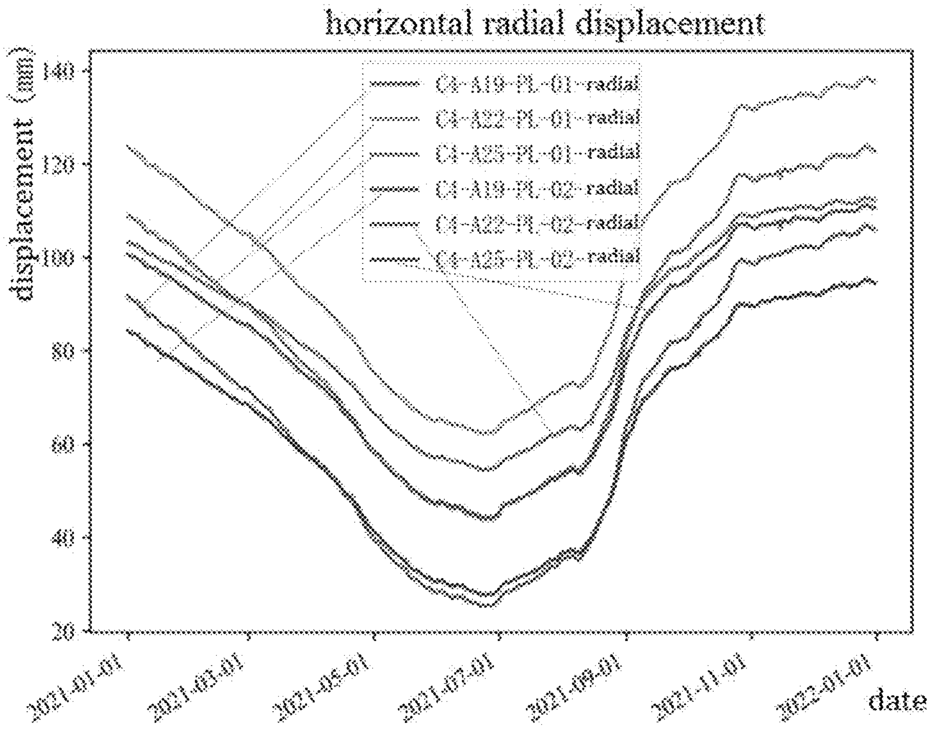
FIG. 5 is a schematic diagram of horizontal radial displacement monitoring data of normal vertical measuring points.
Figure 6A:
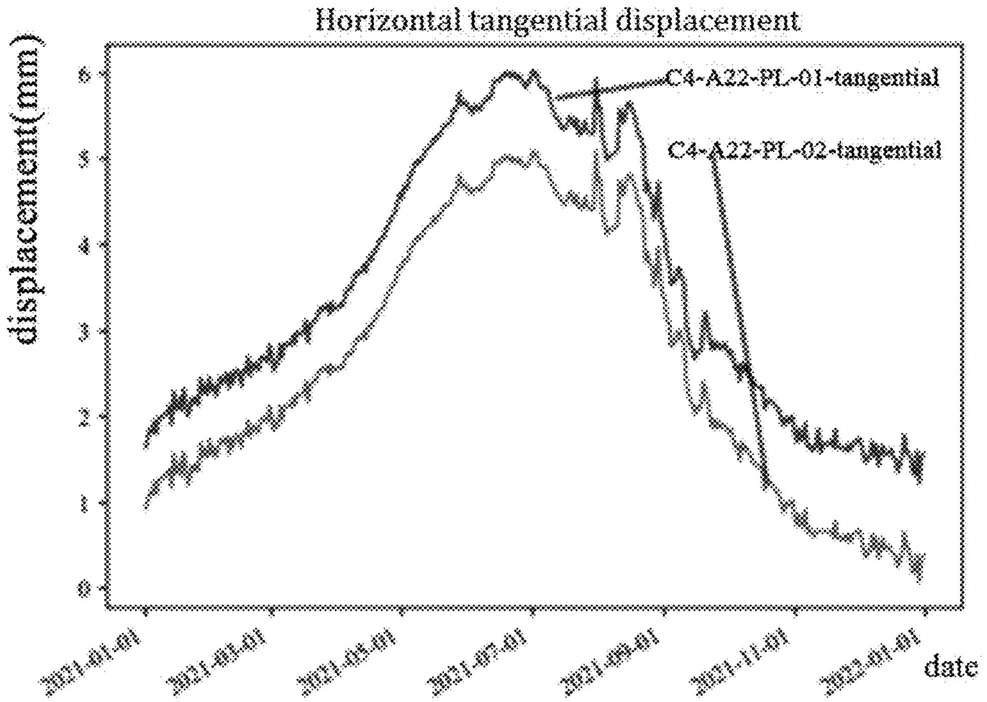
FIG. 6A is a schematic diagram of horizontal tangential displacement monitoring data of typical normal vertical measuring points (C4-A19-PL-01~02)
Figure 6B:
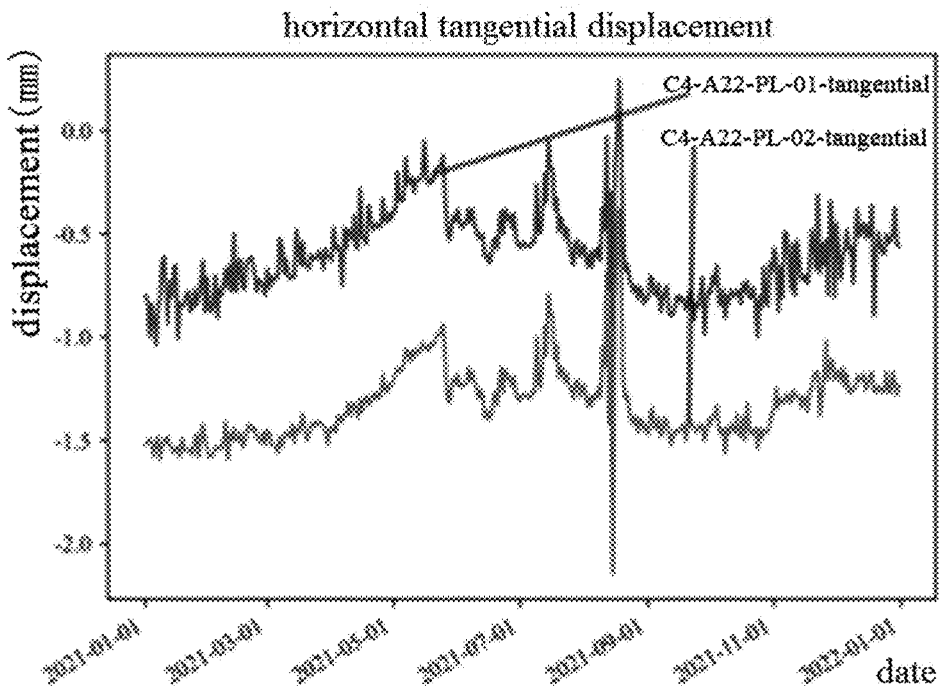
FIG. 6B is a schematic diagram of horizontal tangential displacement monitoring data of typical normal vertical measuring points (C4-A22-PL-01~02)
Figure 7:
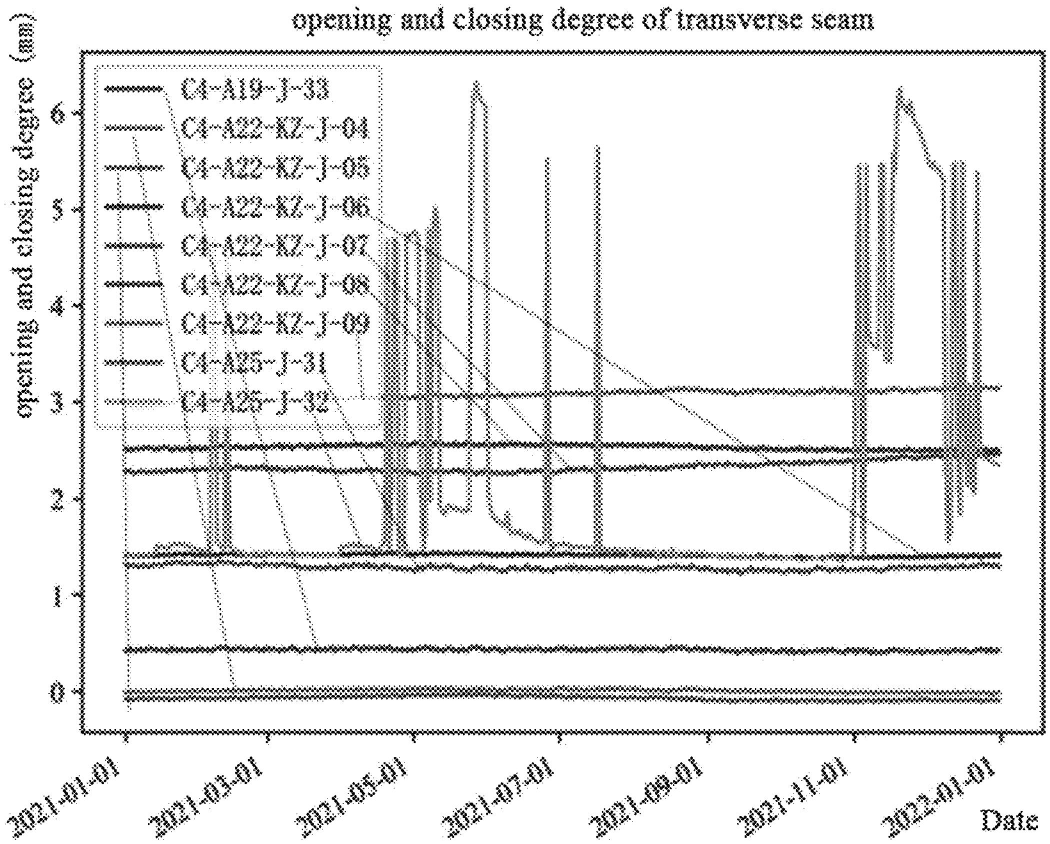
FIG. 7 is a schematic diagram of monitoring data of opening and closing degree of transverse seam of the seam gauge.
Figure 8A:
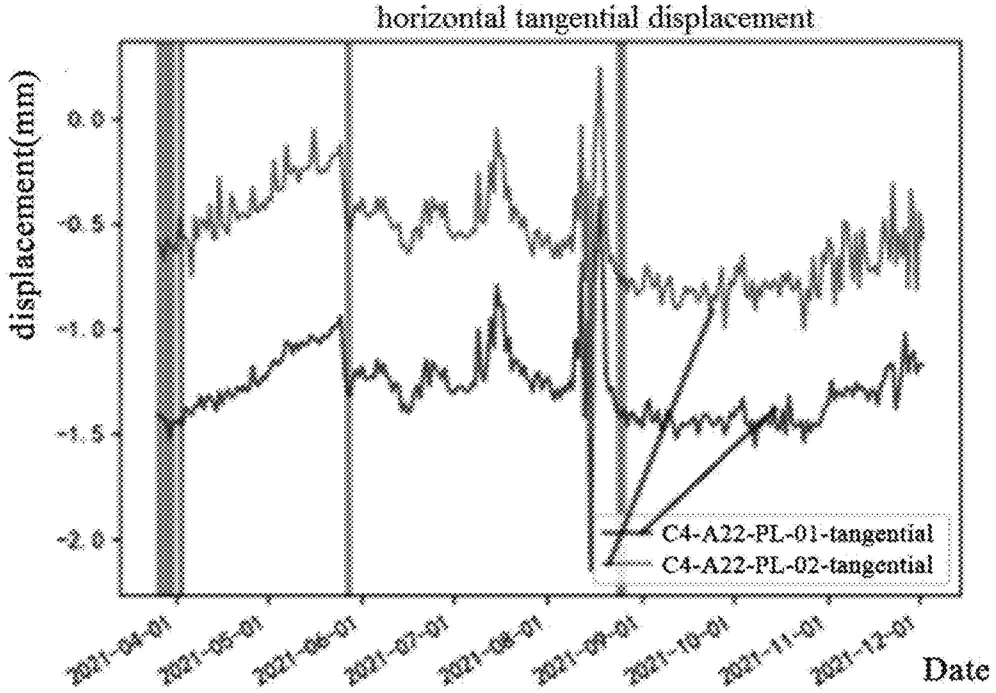
FIG. 8A is a schematic diagram of abnormal detection results of horizontal tangential displacement monitoring data of typical normal vertical measuring points at some time stamps.
Figure 8B:
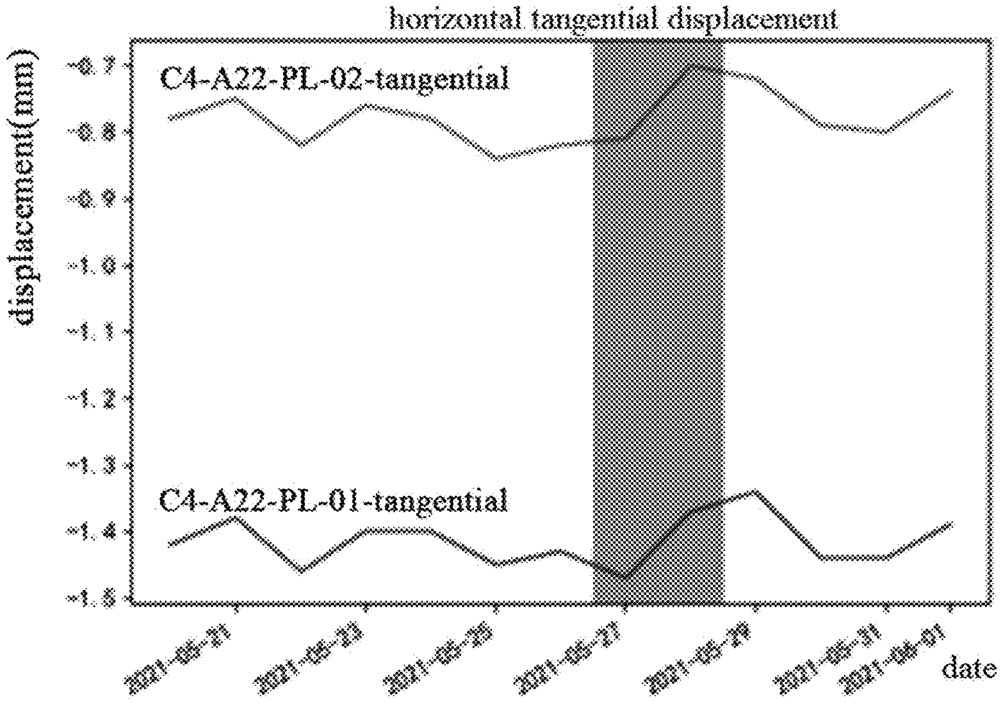
FIG. 8B is a schematic diagram of abnormal detection results of horizontal tangential displacement monitoring data of typical normal vertical measuring points at other some time stamps.
Figure 9A:
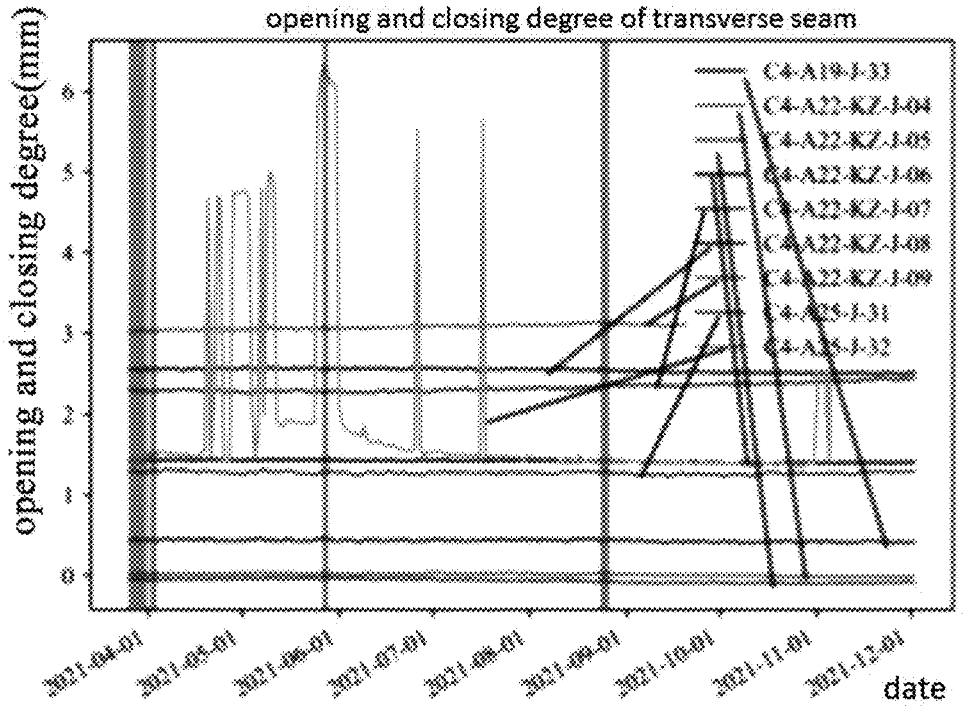
FIG. 9A is a schematic diagram of abnormal detection result of the monitoring data of opening and closing degree of the transverse seam of the seam gauge at some time stamps.
Figure 9B:
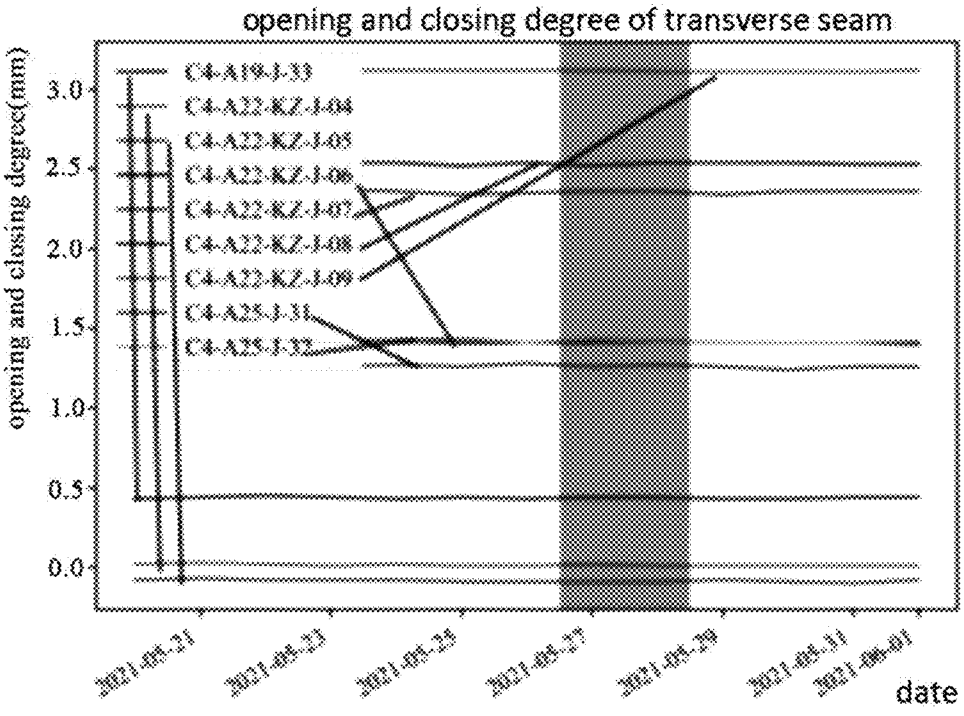
FIG. 9B is a schematic diagram of abnormal detection result of the monitoring data of opening and closing degree of the transverse seam of the seam gauge at other some time stamps.

On the basis of preprocessing the original measured data, firstly, four kinds of monitoring instruments and six kinds of monitoring data used in the experiment are fitted (normal vertical line, radial displacement and tangential displacement of surface deformation observation points are regarded as one kind of data respectively). The data time series spans from Jan. 1 to Dec. 31, 2021, so 365 time stamps are set in total. Typical monitoring data process lines are shown in FIG. 5 to FIG. 7.

Through model training, it is found that the horizontal tangent displacement monitoring data of two measuring points (C4-A22-PL-01 and C4-A22-PL-02) of the normal vertical line of dam section 22 and the transverse seam opening and closing degree monitoring data of 7 measuring points of the seam gauge C4-A22-KZ-J-05 have 13 times of high abnormal scores. As shown in FIGS. 8A, 8B and FIGS. 9A, 9B, the red vertical lines in the figures are marked with 13 abnormal time stamps, which are the monitoring data of Mar. 26, Mar. 27, Mar. 28, Mar. 29, Mar. 30, Mar. 31, Apr. 2, Apr. 3, May 27, May 28, Aug. 25 and Aug. 26, 2021 respectively. After docking with the operation log of the on-site monitoring system, it is found that the top eight abnormal timestamps (that is, from March 26th to April 3rd) is due to the lack of monitoring data caused by the failure of the automatic monitoring acquisition module before March 2021, which leads to the change of measured values being identified and the anomaly score being high, and the detection result is abnormal. The next five abnormal timestamps (that is, from May 27 to May 28, and from August 24 to August 26), on the basis of excluding the data anomalies due to the failure of the monitoring system, analyze the reasons for the anomalies as follows: during the period from May 21 to Jun. 1, and from Aug. 20 to Aug. 30, 2021, two earthquakes with the maximum magnitude of 6.4 and the maximum magnitude of 3.6 occurred in Yangbi County, Yunnan Province, respectively, there are many aftershocks in the next 10 days. The abnormal score of the monitoring data of the concrete dam caused by special working conditions is too large and is recognized as abnormal. From FIGS. 8A, 8B and FIGS. 9A, 9B, it can be seen that there are apparent changes on May 27 and May 28.

Figure 10:
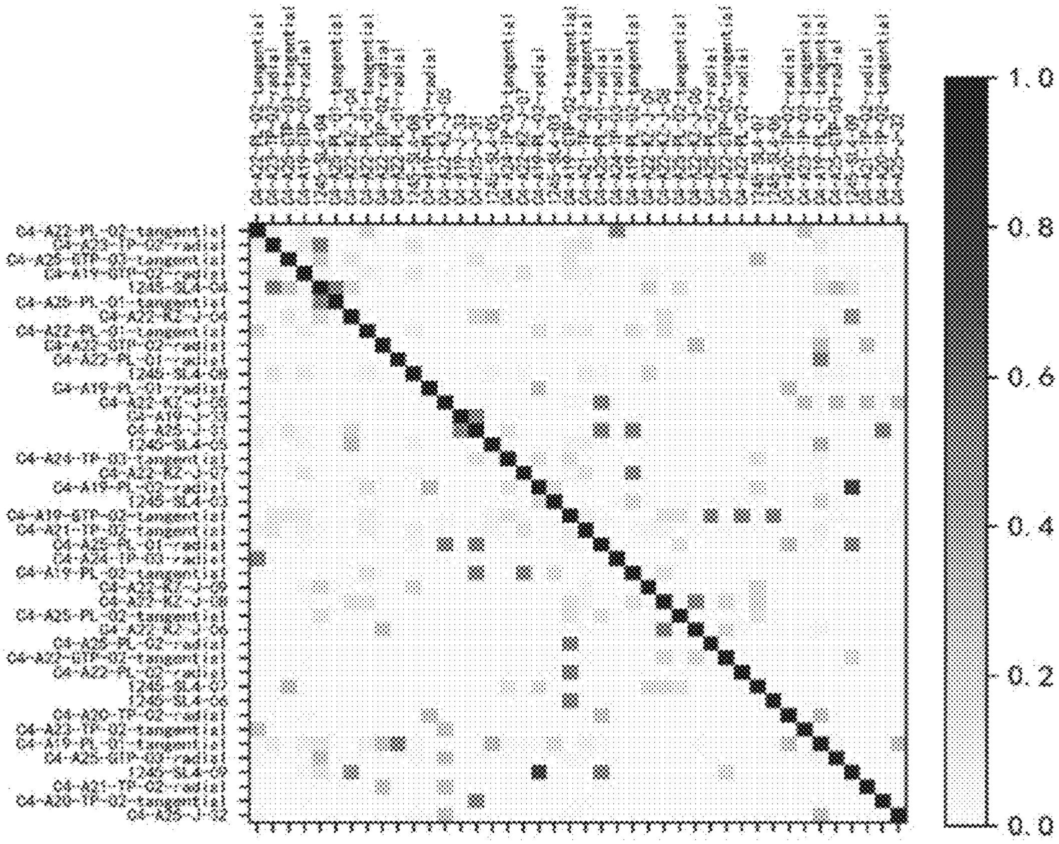
FIG. 10 is a schematic diagram of similarity matrix of arch crown beam partition monitoring model on an upper part of dam body.

After determining the abnormal time points of monitoring data, all the monitoring data in the upper area of the arch crown beam from May 27 to May 28 are selected to establish a similarity matrix, and the correlation between abnormal measuring points is further analyzed. As shown in FIG. 10, the horizontal axis and the vertical axis are all measuring points, representing the correlation between two measuring points, which is expressed by similarity, and the range of values is [0, 1], where 0 represents complete dissimilarity, 1 represents complete similarity, and the color depth represents the level of similarity. It can be seen that there are relatively few squares with dark colors in the figures, indicating that most deformation measuring points do not appear abnormal from May 27 to May 28, so it can be judged that the deformation behavior of this key part is normal.

The specific embodiment of the disclosure also provides a partition monitoring apparatus for the concrete dam operation key parts, including: a memory for storing computer programs; a processor for implementing the steps of the partition monitoring method for the concrete dam operation key parts when executing the computer program.

The specific embodiment of the disclosure also provides a computer-readable storage medium, on which a computer program is stored, when the computer program is executed by a processor, the steps of the above-mentioned partition monitoring method for the concrete dam operation key parts are realized.

It should be understood by those skilled in the art that embodiments of the disclosure can be provided as a method, a system, or a computer program product. Therefore, the disclosure can take the form of an entirely hardware embodiment, an entirely software embodiment, or an embodiment combining software and hardware aspects. Furthermore, the disclosure may take the form of a computer program product implemented on one or more computer usable storage media (including but not limited to disk storage, CD-ROM, optical storage, etc.) having computer usable program codes embodied therein.

The disclosure is described with reference to flowcharts and/or block diagrams of methods, apparatus (systems), and computer program products according to embodiments of the disclosure. It should be understood that each flow and/or block in the flowchart and/or block diagram, and combinations of the flow and/or block in the flowchart and/or block diagram can be implemented by computer program instructions. These computer program instructions may be provided to a processor of a general-purpose computer, special-purpose computer, embedded processor or other programmable data processing apparatus to produce a machine, such that the instructions executed by the processor of the computer or other programmable data processing apparatus produce device for implementing the functions specified in one flowchart or flowcharts and/or one block or blocks.

These computer program instructions may also be stored in a computer-readable memory that can direct a computer or other programmable data processing apparatus to function in a particular manner, such that the instructions stored in the computer-readable memory produce an article of manufacture including instruction device that implement the functions specified in one flowchart or flowcharts and/or one block or blocks.

These computer program instructions may also be loaded onto a computer or other programmable data processing apparatus, such that a series of operational steps are performed on the computer or other programmable apparatus to produce a computer-implemented process, such that the instructions executed on the computer or other programmable apparatus provide steps for implementing the functions specified in one flowchart or flowcharts and/or one block or blocks.

Apparently, the above-mentioned embodiment is only an example for clear explanation, not a limitation of the implementation. For those skilled in the art, other changes and variants in different forms can be made on the basis of the above description. It is not necessary and impossible to exhaust all the embodiments here. However, the apparent changes or variants caused by this are still within the scope of protection created by the disclosure.

What is claimed is:

1. A partition monitoring method for concrete dam operation key parts, comprising:

dividing the concrete dam operation key parts into partitions, and obtaining time series measurement data of monitoring instruments with different types in one of the partitions;

establishing graph structures on the time series measurement data in a time dimension and a variable dimension respectively to obtain a time feature graph and a variable feature graph;

inputting the time feature graph and the variable feature graph into a time graph attention network and a variable graph attention network respectively to obtain a time attention matrix and a variable attention matrix;

splicing and inputting the time series measurement data, the time attention matrix and the variable attention matrix into a gated convolution network to obtain a target feature;

calculating an abnormal score according to the target feature, and judging a concrete dam operation is abnormal if the abnormal score exceeds a preset threshold.

2. The partition monitoring method for concrete dam operation key parts according to claim 1, wherein the dividing the concrete dam operation key parts into partitions comprises:

constructing a measuring point time-frequency vector space-time data matrix according to a measuring point time-frequency vector and a measuring point space vector of the concrete dam operation key parts;

applying Gaussian mixture clustering to the measuring point time-frequency vector space-time data matrix, and taking spatial information of concrete dam safety measuring points as a prior knowledge of component quantity, and constructing a division model of the concrete dam operation key parts under a spatial constraint;

iteratively optimizing and solving parameters of the division model of the concrete dam operation key parts by applying an expectation maximization algorithm to obtain an iteratively optimized division model of the concrete dam operation key parts;

dividing the concrete dam operation key parts by using the iteratively optimized division model of the concrete dam operation key parts.

3. The partition monitoring method for concrete dam operation key parts according to claim 2, wherein obtaining the measuring point time-frequency vector comprises:

decomposing monitoring data of a historical concrete dam structure by a wavelet packet transform, and calculating wavelet packet coefficients of an M layer;

extracting a time domain vector for each of low-frequency coefficients in the wavelet packet coefficients of the M layer;

calculating a wavelet energy spectrum of each of the wavelet packet coefficients in the M layer and extracting a frequency domain vector;

respectively normalizing the time domain vector corresponding to a plurality of the low-frequency coefficients and the frequency domain vector corresponding to a plurality of the wavelet packet coefficients to obtain a normalized time domain vector and a normalized frequency domain vector, and calculating and obtaining the measuring point time-frequency vector according to the normalized time domain vector and the normalized frequency domain vector.

4. The partition monitoring method for concrete dam operation key parts according to claim 1, wherein the establishing graph structures on the time series measurement data in a time dimension and a variable dimension respectively to obtain a time feature graph and a variable feature graph comprises:

setting an embedding vector for each of variables in the time series measurement data;

calculating correlation of the variables according to embedding vectors corresponding to any two variables;

connecting any one of the variables with top K neighbor variables with a greatest correlation of the any one of the variables by first edges in a spatial graph to obtain the variable feature graph;

setting an embedding vector and a position code at each of time points in a sliding time window for the time series measurement data;

calculating time correlation according to embedding vectors corresponding to any two time points;

connecting data at any one of the time points with top K neighbor time points with a greatest time correlation of the data at any one of the time points by second edges in the spatial graph to obtain the time feature graph.

5. The partition monitoring method for concrete dam operation key parts according to claim 1, wherein the inputting the time feature graph and the variable feature graph into a time graph attention network and a variable graph attention network respectively to obtain a time attention matrix and a variable attention matrix comprises:

respectively inputting the variable feature graph into a multi-head attention module, an intra-indicator attention module and an inter-indicator attention module in the variable graph attention network, capturing a variable dependence between multivariate time measured data, a correlation of all the measuring points under the monitoring instruments with same types and a correlation of all the measuring points under the monitoring instruments with different types;

splicing an output of the multi-head attention module, an output of the intra-indicator attention module and an output of the inter-indicator attention module to obtain the variable attention matrix;

inputting the time feature graph into the time graph attention network, aggregating data of neighbor time points to update a feature representation of each one of the time points by combining the position code and using the multi-head attention module, and obtaining the time attention matrix.

6. The partition monitoring method for concrete dam operation key parts according to claim 1, wherein the calculating an abnormal score according to the target feature comprises:

inputting the target feature into a prediction module and a reconstruction module to obtain a prediction value and a reconstruction probability;

calculating the abnormal score according to the prediction value and the reconstruction probability.

7. The partition monitoring method for concrete dam operation key parts according to claim 6, wherein the prediction module is a multi-layer perceptron.

8. The partition monitoring method for concrete dam operation key parts according to claim 6, wherein the reconstruction module comprises a discriminator and an autoencoder.

9. The partition monitoring method for concrete dam operation key parts according to claim 6, wherein a calculation formula for the calculating the abnormal score according to the prediction value and the reconstruction probability is:

$$\text{score} = \sum_{i=1}^{N} \frac{(1 - p_i) + \gamma_2 (x_i - \hat{x}_i)^2}{1 + \gamma_2}$$

wherein, $\hat{x}_i$ is the prediction value, $X_i$ is a measured value, $\gamma_2$ is a superparameter for balancing the prediction module and the reconstruction module, and $p_i$ is the reconstruction probability.

10. An partition monitoring model for concrete dam operation key parts, comprising:

a data acquisition module configured for dividing the concrete dam operation key parts into partitions and obtaining time series measurement data of monitoring instruments with different types in one of the partitions;

a feature graph construction module configured for establishing graph structures on the time series measurement data in a time dimension and a variable dimension respectively to obtain a time feature graph and a variable feature graph;

an attention mechanism module configured for inputting the time feature graph and the variable feature graph into a time graph attention network and a variable graph attention network respectively to obtain a time attention matrix and a variable attention matrix;

a target feature acquisition module configured for splicing and inputting the time series measurement data, the time attention matrix and the variable attention matrix into a gated convolution network to obtain a target feature;

an anomaly detection module configured for calculating an abnormal score according to the target feature, wherein the anomaly detection module judges a concrete dam operation being abnormal if the abnormal score exceeds a preset threshold.

* * * * *